US 6,574,230 B1

(12) United States Patent
Almulhem et al.

(10) Patent No.: US 6,574,230 B1
(45) Date of Patent: Jun. 3, 2003

(54) SCHEDULING TECHNIQUE FOR DELAYED QUEUE SERVICE

(75) Inventors: Abdulaziz S. Almulhem, Dhahran (SA); John E. Vincent, Ottawa (CA); Gary M. Depelteau, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/215,377

(22) Filed: Dec. 18, 1998

(51) Int. Cl.[7] .............................. H04L 12/56; G06F 9/00
(52) U.S. Cl. ...................... 370/412; 370/395.4; 709/102
(58) Field of Search ................. 370/411–420, 230–238, 370/395.4–395.43; 709/102–103

(56) References Cited

U.S. PATENT DOCUMENTS

| | | | |
|---|---|---|---|
| 4,703,475 A | 10/1987 | Dretzka et al. ............... 370/60 |
| 5,168,492 A | 12/1992 | Beshai et al. ................. 370/60 |
| 5,745,486 A | 4/1998 | Beshai et al. ............... 370/352 |
| 5,748,614 A | * 5/1998 | Wallmeier .................. 370/412 |
| 5,859,835 A | * 1/1999 | Varma et al. ............... 370/412 |
| 5,920,568 A | * 7/1999 | Kurita et al. ............... 370/411 |
| 6,188,698 B1 | * 2/2001 | Galand et al. ............. 370/412 |
| 6,262,986 B1 | * 7/2001 | Oba et al. .................. 370/418 |
| 6,295,295 B1 | * 9/2001 | Wicklund .................. 370/412 |

FOREIGN PATENT DOCUMENTS

EP        0524350        7/1991        .......... H04L/12/56

OTHER PUBLICATIONS

Bakouris, M.G.; Giamniadakis, G.S.; Reisis, D.I.; Stamoulis, G.D.; Theologou, O,; Optimizing PCS Network Performance by Utilising a Multilink B–ISDN Routing Protocol; IEEE; Apr. 1994; pp. 330–334.

Ohtsuki, Kazuhiro; Takemura, Kouchi; Kurose, James F. Okada, Hiromi; Tezuka, Yoshikazu; A High–Speed Packet Switch Architecture with a Multichannel Bandwidth Allocation; IEEE; Mar. 1991; pp. 155–162.

* cited by examiner

Primary Examiner—Steven Nguyen

(57) ABSTRACT

A scheduling apparatus, that can be used within a supertrunking capable Internet Protocol (IP) Forwarding (IPF) node, allows for efficient scheduling of packets for servicing after the packets are sorted into their proper order. The scheduling apparatus has a point and serve mechanism, a round-robin mechanism, and a starvation mechanism, and is to be used in situations where an IPF node is sorting and outputting multiple numbers of data streams. The point and serve mechanism directs two supertrunk pointers to the front packets of the particular data streams that the incoming packet segments correspond. The round-robin mechanism rotates a round-robin pointer between the front packets corresponding to all the different data streams. The starvation mechanism flags a data stream as starving if no packets have been scheduled after a predetermined number of times in which the round-robin pointer has been directed at the particular stream. Since only a limited number of packets can be scheduled for servicing at a time and each packet is not necessarily ready to be scheduled, the scheduling apparatus prioritizes the scheduling of the packets. First attempting to schedule the front packets selected by the point and serve mechanism, then the starvation mechanism, and finally the round-robin mechanism.

19 Claims, 8 Drawing Sheets

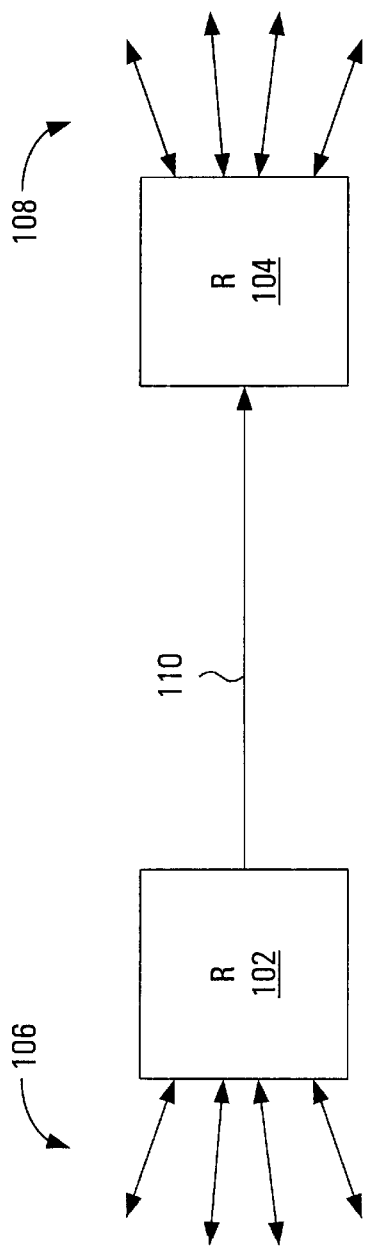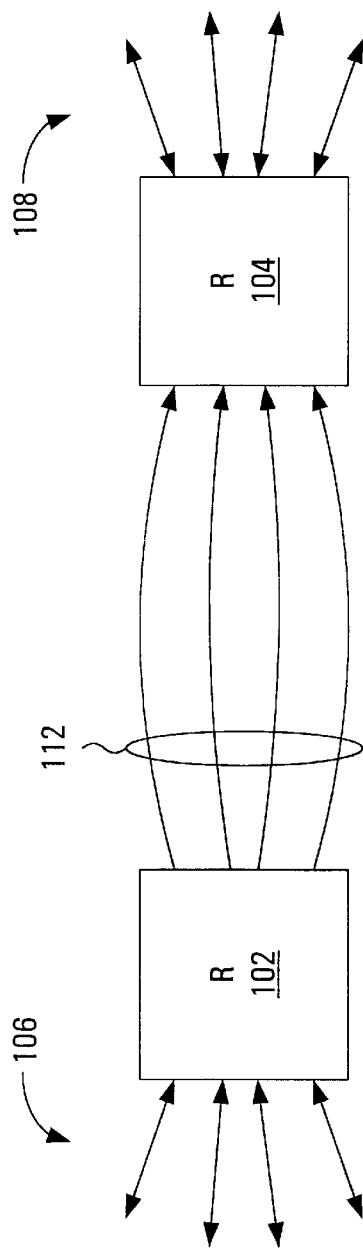

PACKET FORWARDING HEADER

IP ENCAPSULATED IN IP DATAGRAM

SCHEDULING TECHNIQUE FOR DELAYED QUEUE SERVICE

RELATED APPLICATIONS

U.S. patent applications entitled "Supertrunking for Packet Switching" and "Flow-Level Demultiplexing within Routers" both by Almulhem et al, both filed on the same day as the present application, and both assigned to the assignee of the present application, disclose and claim subject matter related to that of the present invention and are herein incorporated by reference.

FIELD OF THE INVENTION

This invention relates generally to data routing systems and more specifically to data packet routing systems over multiple physical links.

BACKGROUND OF THE INVENTION

The following paragraphs give definitions of terms used throughout this document.

Physical link: a single point-to-point (PPP) serial transmission link between two nodes in the network (such as between two routers or between a router and a host machine). The implementation of a serial link may take various forms such as an optical fibre or a wavelength segment on an optical fibre, among other options.

Physical input/output port: the input/output port of the router that supports one physical link.

Logical link: a point-to-point traffic path between two routers that is composed of multiple physical links and appears from a routing point of view to be one link.

Logical input/output port: the collection of physical input/output ports that support the physical links of a logical link.

Supertrunk: the aggregation of physical links into larger, logical links.

Transmission Control Protocol (TCP): a library of routines that applications can use when they need reliable network communications with another computer. TCP is responsible for verifying the correct delivery of data from client to server. It adds support to detect errors or lost data and to trigger reconstruction until the data is correctly and completely received.

Internet Protocol (IP): a library of routines that TCP calls on, but which is also available to applications that do not use TCP. IP is responsible for transporting packets of data from node to node. It forwards each packet based on a four-byte destination address (the IP address).

There has been an incredible increase in demand for bandwidth within communication routing systems over the past few years. This increase is particularly pronounced when considering the increase in data networking information transferred within these systems directly associated with the expanding popularity of the Internet. Soon the traffic rates needed between router pairs will be higher than the serial link transmission technology available. Currently, the highest transmission rate is 9.6 Gb/s, (on a single wavelength) but 2.4 Gb/s is much more commonly available. Purchasers of routers are already demanding 2.4 Gb/s links and it is expected that within a short time, some routes will require multiple physical links.

There are other reasons why multi-link routes are attractive. In situations where routers are clustered in close physical proximity, the use of multiple links might allow the interconnect to be multiple low cost links rather than single high cost connections. Another reason is that the application of the multi-link approach might also be a fast way to provide higher rate ports on existing routers. Yet another reason is that the use of multiple links allows more granularity of growth than the large steps in the transmission network and so may allow savings in bandwidth costs. Finally, another reason is that multiple links can allow for redundancy to cover link failure without requiring the spare link to cover the whole bandwidth of the route.

When using multiple links between two routers, it is a requirement that the total bandwidth be used efficiently. That is to say, the traffic offered must be spread over all available links, hereinafter referred to as load balancing. It would not be acceptable to have one link under utilized while traffic is queued on another. This suggests that packets from any source can be delivered over any link to any destination. In fact, because of the bursting nature of the traffic, allocating links statically to particular sources or destinations would result in inefficient use of the total available bandwidth.

When traffic streams are spread over multiple links, successive packets from a particular flow (for example, a TCP connection between two IP hosts) can travel over different lengths and may arrive at the destination out of order. The variability of delay can be caused by different path lengths or different congestion levels on the paths, as well as the normal indeterminacy introduced by queuing and scheduling. The TCP can accommodate some mis-ordering of packets, but there is a problem if too much mis-ordering occurs on a connection where the transmitter is using the fast retransmission protocol.

To combat this mis-ordering of packets, a sorting function that places, the packets in the proper order is utilized within routers implemented with a supertrunking capability. In cases that multiple data streams are routed to a single router via the same supertrunk, incoming packets from different data streams may be mixed with incoming packets of a plurality of other data streams. In such cases, each incoming data stream is sorted independently and assigned a memory location for the buffering of the packets.

A key problem that occurs within a router that receives packets from a plurality of data streams simultaneously over a single supertrunk is the scheduling of the packets corresponding to the different data streams for service after being sorted. Only a limited number of packets can be serviced at a time. Hence, a decision procedure is required to select which of the sorted data streams to service a packet from during each servicing period. To maintain the efficiency gained by supertrunking data packets, this scheduling procedure must be sufficiently effective so as to not significantly diminish the advantages gained through use of supertrunks. To maintain efficiency, such a procedure should allow data streams with considerable numbers of incoming packets to be serviced frequently while still allowing data streams with few incoming packets to get a minimum level of service.

SUMMARY OF THE INVENTION

It is an object of the present invention to overcome the disadvantages of the prior art and, in particular, to provide an apparatus and method for efficiently scheduling the service of packets within data packet communication systems.

According to a first broad aspect, the present invention provides a scheduling apparatus capable of being coupled to a plurality of memory buffers, each memory buffer capable of inputting data packet units and outputting data packets corresponding to a single data stream, the scheduling apparatus scheduling the outputting of the data packets from the memory buffers with use of scheduling logic; and wherein the scheduling logic operates, if a first data packet unit from a first data stream is input to a first memory buffer, to determine whether a first outputting parameter corresponding to a front packet within the first memory buffer is met and to output the front packet from the first memory buffer if the first outputting parameter is met.

In a preferable embodiment, the present invention provides a scheduling apparatus according to the first aspect, wherein the scheduling logic further operates to maintain a counter corresponding to each memory buffer, to select a round-robin (RR) memory buffer during each inputting of a data packet packet, each memory buffer cyclically being selected as the RR memory buffer, and incrementing the counter of the RR memory buffer if an incrementing parameter is met; wherein the scheduling logic further operates, if the first outputting parameter is met, to reset the counter of the first memory buffer; and wherein the scheduling logic further operates, if the first outputting parameter is not met, to determine whether any memory buffers are starving by checking if any counters exceed a predetermined maximum value; if a starving memory buffer is found, to determine whether a starvation outputting parameter, corresponding to a front packet within the starving memory buffer is met and, if the starvation output parameter is met, to output the front packet from the starving memory buffer and to reset the counter of the starving memory buffer; and if no starving memory buffers are found or if the starvation output parameter is not met, to determine whether a RR outputting parameter corresponding to a front packet within the RR memory buffer is met and, if the RR outputting parameter is met, to output the front packet within the RR memory buffer and reset the counter of the RR memory buffer.

According to a second broad aspect, the present invention provides a forwarding node, incorporating a scheduling apparatus according to the first broad aspect, capable of operation within a router that transfers digital data with a plurality of other routers within a packet routing system, the forwarding node comprising: a first device that comprises an inputting apparatus that is capable of inputting a plurality of data packet units from a plurality of data streams; a plurality of memory buffers coupled to the inputting apparatus, each memory buffer capable of inputting data packet units and outputting data packets corresponding to a single data stream; and the scheduling apparatus that controls the outputting of data packets from the memory buffers; and a servicing device that is input with the packets from the memory buffers and performs servicing operations on the individual packets.

According to a third broad aspect, the present invention provides a router, incorporating at least one first forwarding node according to the second broad aspect, capable of operation within a packet routing system that transfers digital data between a plurality of the routers, the router comprising: a route controller; a rotator space switch; at least one second forwarding node, coupled to both the route controller and the rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports; at least one third forwarding node, coupled to both the route controller and the rotator space switch, that is arranged to operate as a physical output port for outputting encapsulated packets to at least one transmission apparatus; at least one fourth forwarding node, coupled to both the route controller and the rotator space switch, that is arranged to operate as a physical input port for receiving encapsulated packets from at least one transmission apparatus; and the first forwarding node, coupled to the route controller and the rotator space switch, further comprising a packet sorting device that, when input with encapsulated packets, re-orders the packets into the proper order within the memory buffers with use of a sorting algorithm utilizing the packet sequence identifiers; and wherein the servicing device, after performing servicing on the packets, outputs a data stream corresponding to the re-ordered packets.

According to a fourth broad aspect, the present invention provides in a control apparatus capable of operating with a plurality of memory buffers, each memory buffer capable of inputting data packet units and outputting data packets corresponding to a single data stream, a method of scheduling the output of packets from the memory buffers comprising the steps of determining, if a first data packet unit from a first data stream is input to a first memory buffer, whether a first outputting parameter corresponding to a front packet within the first memory buffer is met and outputting the front packet from the first memory buffer if the first outputting parameter is met.

BRIEF DESCRIPTION OF THE DRAWINGS

The preferred embodiment of the present invention is described with reference to the following figures, in which:

FIGS. 1a and 1b are simplified diagrams illustrating logical and physical routing links respectively;

DETAILED DESCRIPTION OF THE PREFERRED EMBODIMENT

Figure 2:
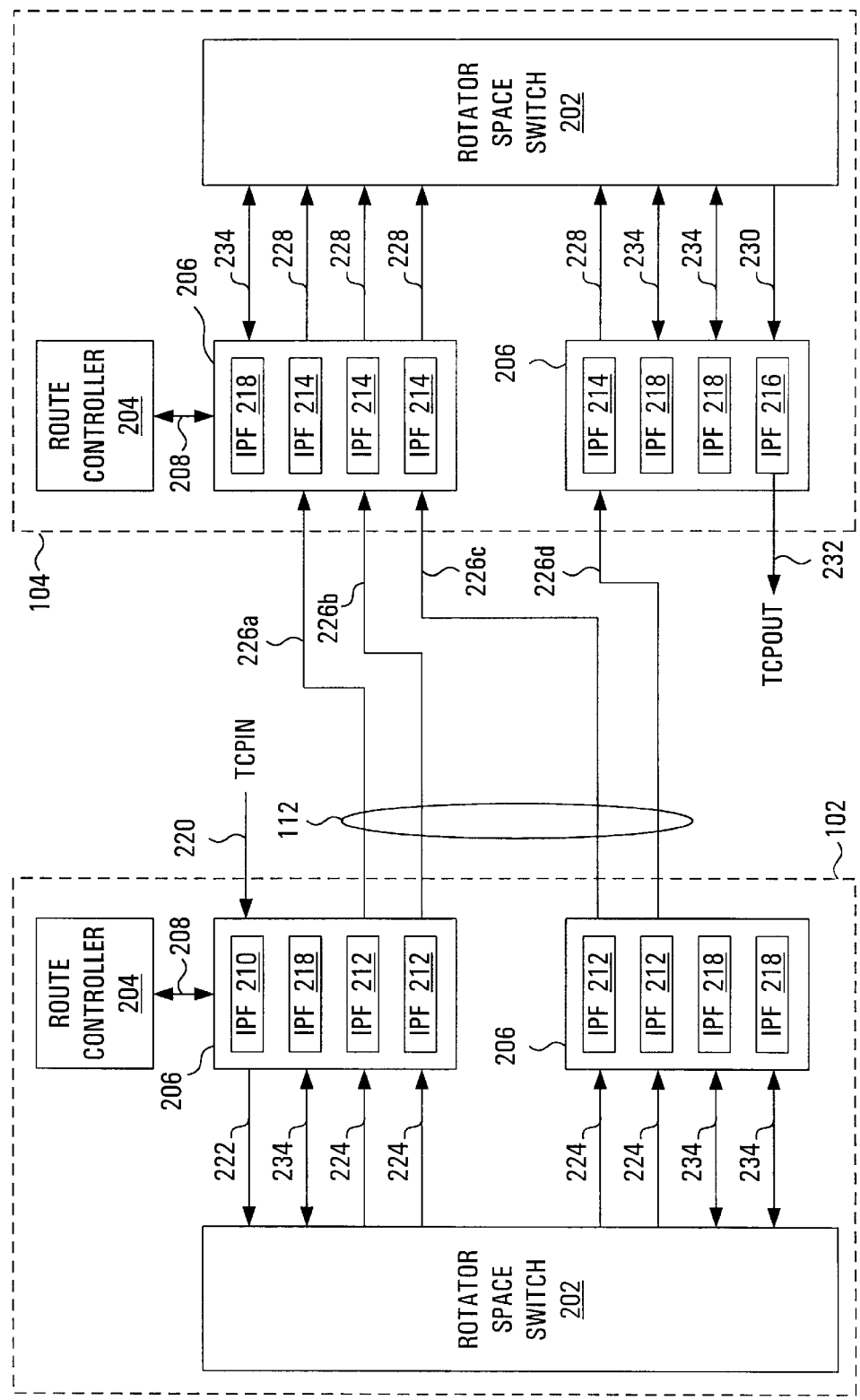
FIG. 2 is a block diagram of a routing system according to an example application of the preferred embodiment of the present invention.

FIGS. 1a and 1b illustrate example logical and physical routing systems respectively that depict communication links from a first router 102 to a second router 104. Both the first and second routers 102,104 are connected to a plurality of other communication links 106,108 respectively. Within FIG. 1a, a logical link 110 is shown coupled between the routers 102,104. In this particular example, the logical link is a 3.5 Gb/s connection. FIG. 1b illustrates a series of physical links 112, that make up a supertrunk, coupled between the routers 102,104 that together are equivalent to the logical link 110. The supertrunk 112, in this example, comprises four physical links that when combined total the 3.5 Gb/s of the logical link 110.

Each of the physical links 112 depicted in FIG. 1b may be implemented with a series of connections within a series of different networks. Despite appearing within FIG. 1b as being directly connected and physically local, it should be understood that physical links 112 are typically quite complex with the routers 102,104 possibly a large distance from each other.

FIG. 2 is a block diagram of a routing system between the first router 102 and the second router 104 illustrating an example application of the preferred embodiment of the present invention. Each router 102,104, according to the preferred embodiment, comprises a rotator space switch 202, a route controller 204, and a plurality of transport nodes 206. The routers 102,104 depicted in FIG. 2 each comprise two transport nodes, though this is not meant to limit the scope of the present invention. The rotator space switch 202 and the route controller 204 are independently coupled to each transport node 206, although, within FIG. 2, the route controller 204 is only shown to be coupled to one transport node 206 via signal bus 208.

A person skilled in the art would understand that the operation of the rotator space switch 202 and the route controller 204 would be specific to a particular company's implementation. For example, one such rotator space switch is disclosed in U.S. Pat. No. 5,745,486 entitled "High Capacity ATM Switch" by Beshai et al and assigned to the assignee of the present invention. No modifications are made in the route controller 204 and the rotator space switch 202 from prior art devices within the preferred embodiment of the present invention.

Each transport node 206 comprises a plurality of Internet Protocol Forwarding (IPF) nodes 210,212,214,216,218. In FIG. 2, each transport node 206 comprises four IPF nodes, though this is not meant to limit the scope of the present invention. In fact, the routers 102,104, in an alternative embodiment, do not comprise transport nodes, but instead have a plurality of IPF nodes, coupled independently to the route controller 204 and the rotator space switch 202, that are not within transport nodes.

The IPF nodes, within the system depicted in FIG. 2, include an input IPF node 210, a plurality of supertrunk output IPF nodes 212 representing a single logical output port, a plurality of supertrunk input IPF nodes 214 representing a single logical input port, an output IPF node 216, and a plurality of other IPF nodes 218 which are unrelated to the description herein below of an example application of the preferred embodiment of the present invention. Each IPF node, according to the preferred embodiment, is identical. Hence, any one of the IPF nodes may, in practice, be an input IPF node, a supertrunk output IPF node, a supertrunk input IPF node, or an output IPF node.

As depicted in FIG. 2, the input IPF node 210 is within a transport node of the first router 102 and is input with a TCP input signal (TCPIN) via line 220. The input IPF node 210 is coupled to the rotator space switch 202 of the first router 102 via line 222.

The plurality of supertrunk output IPF nodes 212 are spread across the transport nodes 206 of the first router 102. In this example, there are four supertrunk output IPF nodes 212 with two in each transport node 206 of the first router 102, though other configurations are possible. The supertrunk output IPF nodes 212 are each independently coupled to the rotator space switch 202 of the first router 102 via lines 224 and, via the supertrunk 112, to the second router 104. The supertrunk 112 comprises physical links 226a,226b, 226c,226d between the supertrunk output IPF nodes 212 (the physical output ports) within the first router 102 and the supertrunk input IPF nodes 214 (the physical input ports) within the second router 104.

The supertrunk input IPF nodes 214 are spread across the two transport nodes 206 of the second router 104. In this example, there are four supertrunk input IPF nodes 214, three in one transport node 206 and one in the other. This illustrated configuration is not meant to limit the scope of the present invention and it should be recognized that the number of supertrunk input IPF nodes 214 does not have to equal the number of supertrunk output IPF nodes 212. A single supertrunk output IPF node 212 could be coupled via a plurality of physical links to a plurality of supertrunk input IPF nodes 214 and a plurality of supertrunk output IPF nodes 212 could be coupled to the same supertrunk input IPF node 214. Each of the supertrunk input IPF nodes 214 are independently coupled to the rotator space switch 202 of the second router 104 via lines 228.

The output IPF node 216 is within the transport node 206 of the second router 104 that has only one supertrunk input IPF node 214, but it is recognized that the output IPF node 216 could be located in any transport node 206 of the second router 104. The output IPF node 216 is coupled to the rotator space switch 202 of the second router 104 via line 230 and outputs a TCP output signal (TCPOUT) via line 232.

The other IPF nodes 218 are simply shown within FIG. 2 to illustrate that other operations are being performed concurrently with the example application described herein below. Each of the other IPF nodes 218 is coupled to the rotator space switches 202 of the respective router 102,104 via lines 234.

The supertrunking operation of the routing system of FIG. 2, according to the preferred embodiment of the present invention, is now described by example. The TCPIN, which is an IP data stream in this case, is input to the input IPF node 210 packet by packet, each packet having an IP header attached to it. The input IPF node 210 attaches a Packet Forwarding Header (PFH), described in detail herein below, and a Rotator Information Unit (RIU) header to the particular packet. The PFH comprises an IP stream identifier that is a unique number generated for each IP stream that is input to the input IPF node 210 and a sequence number corresponding to the location of the packet relative to the other packets of the IP stream. The RIU header comprises a physical output port indicator that corresponds to a particular physical output port 212 determined for the particular IP packet within a load balancing function. A sample load balancing function is disclosed within the previously referenced U.S. patent application entitled "Supertrunking for Packet Switching" by Almulhem et al which was previously incorporated by reference.

These IP packets with their respective PFH and RIU header are then forwarded to their respective supertrunk output IPF nodes 212 via the line 222, the rotator space switch 202 of the first router 102, and the lines 224. The supertrunk output IPF nodes 212 then proceed, for each individual packet, to read the contents of the PFH, to remove the PFH and RIU header from the packet, and to encapsulate the packet, hereinafter referred to as an encapsulated packet, within a supertrunk header and an encapsulating IP header. The supertrunk header comprises the IP stream identifier and the sequence number while the encapsulating IP header comprises source and destination addresses that are copied from the source and destination addresses of the packet's original IP header. Hence, the destination address corresponds to the output IPF node 216 and the actual physical link 226 taken by the packet depends upon the network between the router 102 and the router 104. In this particular example, the encapsulated packets with sequence numbers 1, 2, 3, 4, and 5 have traversed physical links 226c, 226d, 226b, 226a, and 226d respectively.

The encapsulated packets are received at the supertrunk input IPF nodes 214. The supertrunk input IPF nodes 214 read the destination address within the encapsulating IP header and subsequently forward the packets to the output IPF node 216 via the lines 228, the rotator space switch 202 of the second router 104, and the line 230. The output IPF node 216 comprises a sorting function that re-orders the packets in the proper order, a scheduling function that schedules the packets for servicing, and a processing device that services the individual packets, the service including removing the encapsulating IP header and the supertrunk header from the packets, and outputs TCPOUT. TCPOUT, in this case, would be an IP stream consistent with the IP stream of TCPIN. A sample sorting function is disclosed within the previously referenced U.S. patent application entitled "Supertrunking for Packet Switching" by Almulhem et al which was previously incorporated by reference. The preferred embodiment of the scheduling function is described in detail later within this document.

Figure 3:
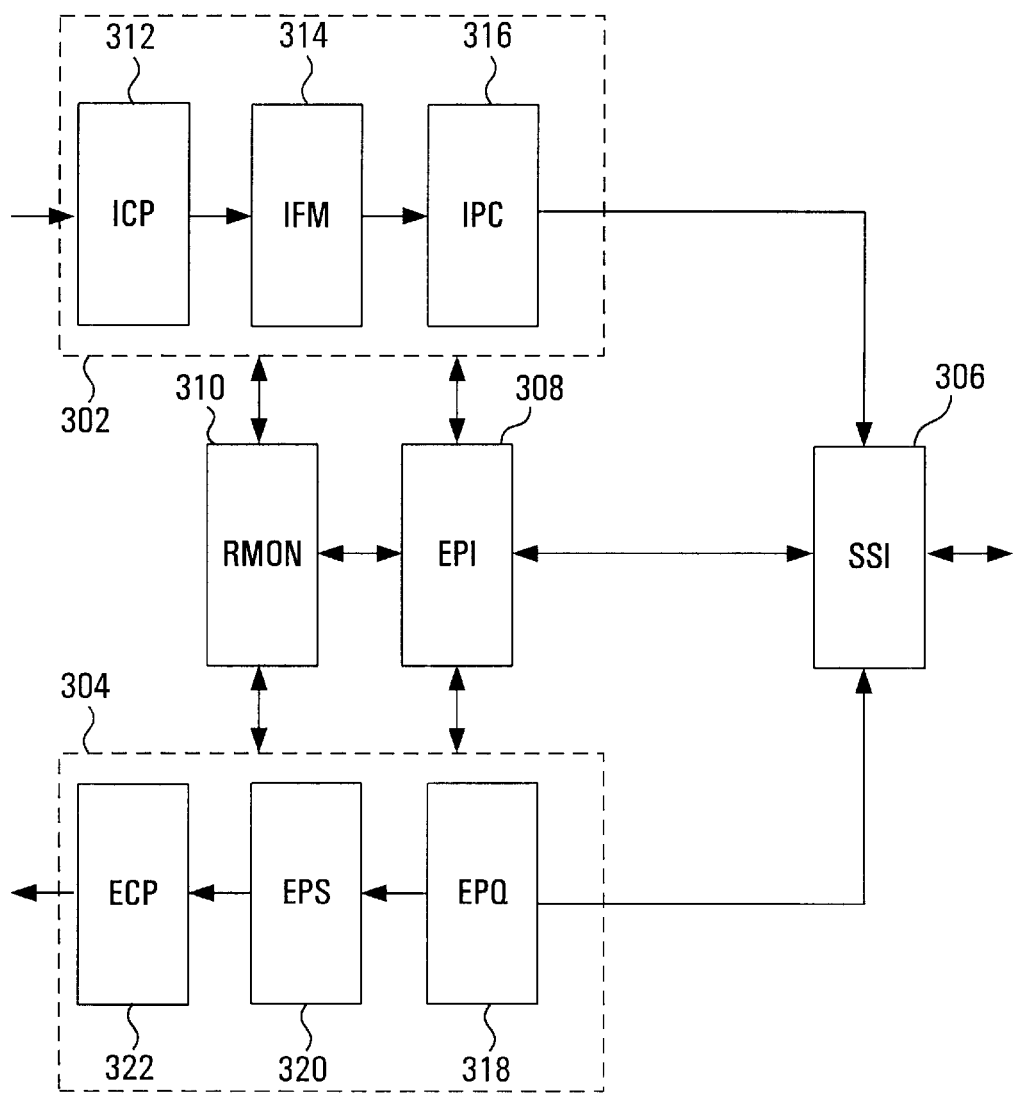
FIG. 3 is a block diagram of an Internet Protocol (IP) Forwarding (IPF) node used in FIG. 2.

The IPF nodes of FIG. 2 according to the preferred embodiment of the present invention are now described in detail with reference to FIG. 3. In this preferred embodiment, all of the IPF nodes are identical and therefore, all of the IPF nodes contain the load balancing function, the ability to encapsulate and de-encapsulate the packets, the sorting function, and the scheduling function. As depicted in FIG. 3, each IPF node comprises an ingress block 302, an egress block 304, a Space Switch Interface (SSI) 306, an Embedded Processor Interface (EPI) 308, and a Router Monitor (RMON) 310. The ingress block 302 comprises an Ingress Convergence Processor (ICP) 312 coupled in series with an Ingress Filter and Mapper (IFM) 314, and an Ingress Port Controller (IPC) 316 further coupled to the SSI 306. The egress block 304 comprises an Egress Packet Queuer (EPQ) 318 coupled to the SSI 306 and further coupled in series with an Egress Packet Scheduler (EPS) 320, and an Egress Convergence Processor (ECP) 322. It is noted that according to the preferred embodiment, all of these components are discrete devices, though in alternative embodiments some or all of these components could be combined or implemented within software.

The EPI 308, in the preferred embodiment, is coupled to the components of both the ingress and egress blocks 302,304 along with the SSI 306 and the RMON 310. The RMON 310 is further coupled to at least one component in each of the ingress and egress blocks 302,304. In the preferred embodiment, the RMON 310 is coupled to the outputs of the IPC 316 and the EPS 320. The EPI 308 is the local processor for the IPF node that performs numerous processor related functions. The RMON 310, on the other hand, is utilized as a central point for all counters within the IPF node.

The following is a simplified description of the operation within the devices of the IPF node during ingress and egress functions according to the preferred embodiment of the present invention. It is noted that the devices of FIG. 3, with the exception of the IPC 316, the EPQ 318, and the ECP 322, are not modified in the preferred embodiment of the present invention and one skilled in the art would understand their operations.

Figure 4A:
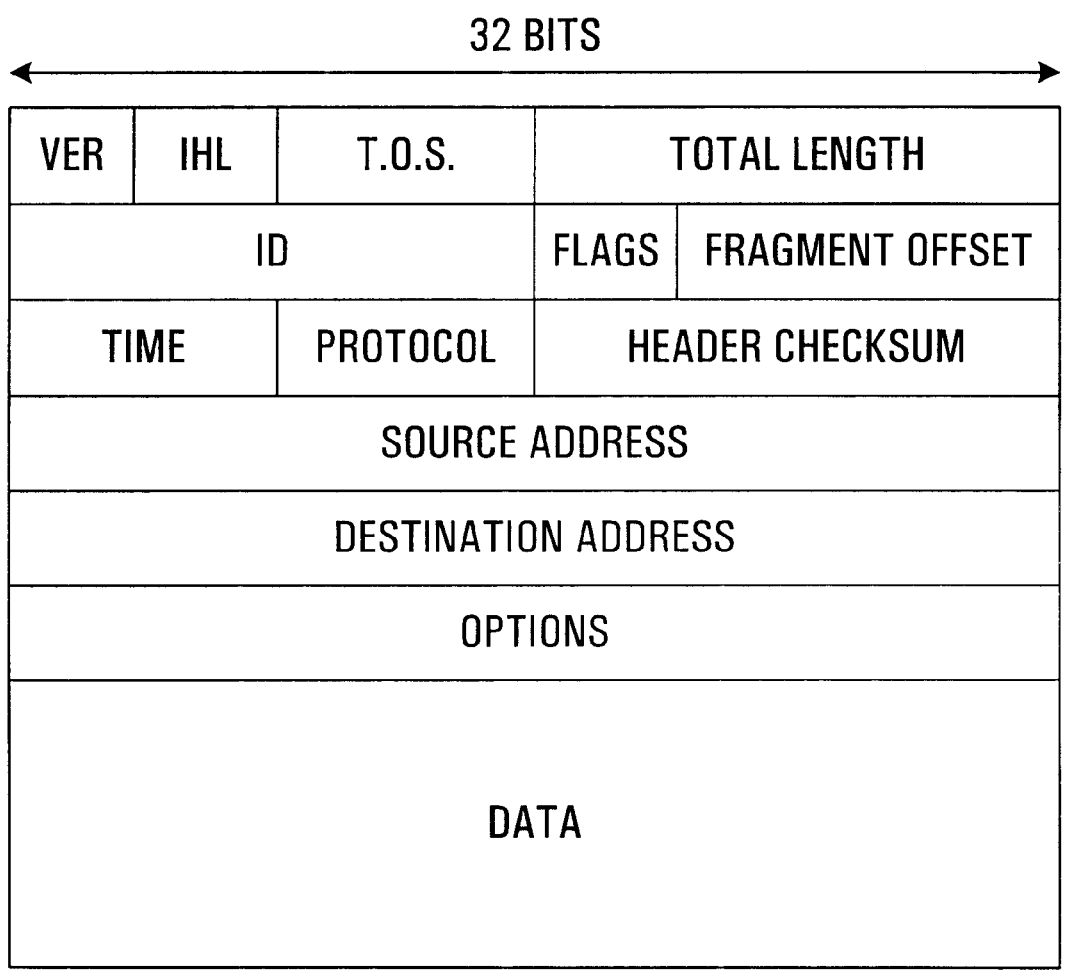
FIGS. 4a, 4b, and 4c illustrate a standard IP datagram, a Packet Forwarding Header (PFH) according to the preferred embodiment of the present invention, and an encapsulated IP packet according to the preferred embodiment of the present invention respectively.

In the preferred embodiment, IP datagrams, such as the standard one shown within FIG. 4a, are input to the input IPF node. During the receiving of an incoming IP data packet, the ICP 312 terminates the ingress physical and link layer interfaces, verifies the link layer, IP headers, and formatting, maps the incoming packet to a Receive Context Identifier (RCI) that is a generic tag to uniquely identify the logical interface that a packet arrived on, and encapsulates the packet with a PFH. As described herein below, not all the contents of the PFH are inserted by the ICP 312, but bytes are reserved for the entire PFH.

Figure 4B:
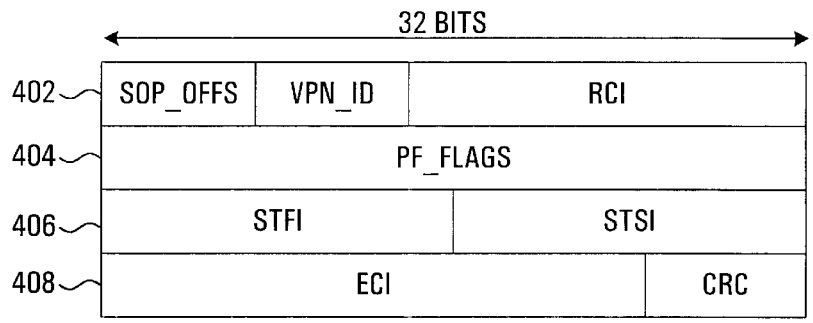

The PFH, with reference to FIG. 4b, comprises four 32 bit words. The first word 402 comprises a 4 bit Start Of Packet Offset (SOP_OFFS) signal that indicates the position of the first word of the packet to be sent to the link layer for segmentation, an 8 bit Virtual Private Network Identifier (VPN_ID) signal that identifies the virtual private network or virtual router interface that the packet arrived on, and the 20 bit RCI. The second word 404 comprises 32 bits of Packet Forwarding Flags (PF_FLAGS) that are a collection of generic status and control flags. The third word 406 comprises a 16 bit Supertrunk Flow Identifier (STFI) signal and a 16 bit Supertrunk Sequence Identifier (STSI) signal, both of which are described in detail herein below. The fourth word 408 comprises a 24 bit Egress Context Identifier (ECI) that is the result of a forward look-up function which indicates the logical output port for the individual packet, and an 8 bit PFH Integrity Check (CRC). The contents of the first word 402 of the PFH are determined and inserted by the ICP 312 while the contents of the second word 404 can be set or modified by each of the blocks of the IPF node. The third and fourth words 406,408 are reserved space by the ICP 312, but the contents of the third and fourth words 406,408 are determined and inserted by other devices as are described herein below.

The outputted packet from the ICP 312 is input to the IFM 314 which maps the incoming packet to the logical ECI, inserts the ECI into the PFH, and filters the packet based upon a configured policy. The IPC 316 then receives the packet and performs the load balancing function which inserts the STFI and STSI signals into the PFH and encapsulates the packet in an RIU header which maps the packet to a physical port determined by the load balancing function.

The STFI is a unique identifier for the data stream, preferably an IP stream, in which the packet, preferably an IP packet, is part. A data stream is defined, in the preferred embodiment, by the ECI that the packet has been assigned, with each of the STFI signals being saved in a look-up table along with their corresponding ECIs. Hence, the first packet of a data stream will have an ECI not found in the look-up table and so will be assigned a new STFI signal. Subsequent packets of the same stream, with identical ECI, will be assigned the identical STFI signal. An ECI is removed from the look-up table after a predetermined refresh period has expired that indicates that no further packets of that particular data stream are still to arrive. The STSI signal is a unique indicator given to each packet within a particular data stream that corresponds to the order in which the packet was input to the IPC 308.

Subsequently, the packet is input to the SSI 306 which is the interface between the rotator space switch 202 and the particular IPF node of FIG. 2. The SSI 306 then outputs the packet through the rotator space switch to the particular physical output port chosen by the load balancing function.

Figure 4C:
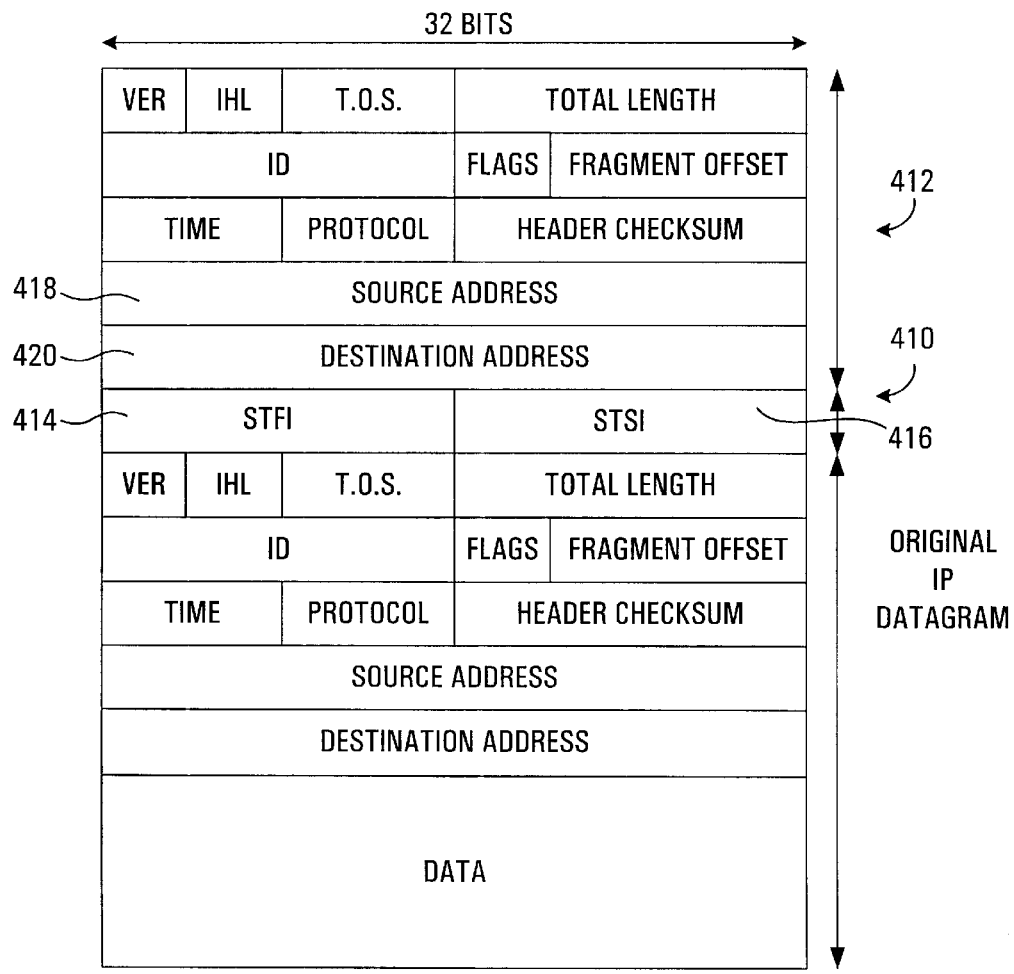

At the physical output port, the packet is input to the SSI 306 and forwarded, via the EPQ 318 and the EPS 320, to the ECP 322. The ECP 322 subsequently reads the STFI and STSI from the PFH, removes the PFH and the RIU header from the packet, and encapsulates, as depicted within FIG. 4c, the packet within a supertrunk header 410 and an encapsulating IP header 412. The supertrunk header 410 comprises the 16 bit STFI signal 414 and the 16 bit STSI signal 416, both of which are described in detail herein below, while the encapsulating IP header comprises a source address 418 and a destination address 420 that are copied from the IP header of the packet's original datagram. Hence the destination address within the encapsulating IP header corresponds to the output IPF node for the packet's IP stream.

The IP encapsulated packet is subsequently forwarded, via a physical link, to a physical input port; that being an IPF node within the router of the destination output IPF node. One key advantage of utilizing the IP encapsulating header is that the IP encapsulated packet is simply treated within any networks of the physical link as a standard IP datagram of FIG. 4a with the data portion of the datagram being the supertrunk header and the original IP datagram.

An alternative embodiment of the present invention does not have the packets encapsulated in an additional IP header. This embodiment has the disadvantage of requiring the physical link traversed by the packets to comprise strictly proprietary devices that can recognize the supertrunk header and can read the source and destination addresses of the original IP datagram.

Within the preferred embodiment of the present invention, the IP encapsulated packets are received at a physical input port and input to the corresponding ICP 312. The ICP 312 and the IFM 314 perform similar functions as described herein above, such as attaching a PFH to the IP encapsulated packet, and forwards the encapsulated packet to the IPC 316. The load balancing function within the IPC 316 is not performed on the encapsulated packet since the output IPF node for the packet is within the same router. The IPC 316 simply attaches an RIU header, which maps the packet to the output IPF node indicated by the destination address of the encapsulating IP header, to the already encapsulated packet and forwards it, via the SSI 306 and the rotator space switch, to the SSI 306 of the output IPF node.

The packet is forwarded by the SSI 306 of the output IPF node to the EPQ 318. The EPQ 318 reassembles packet segments, re-orders the encapsulated packets utilizing the sorting function, and schedules the forwarding of the sorted packets to the EPS 320 utilizing the scheduling function. Subsequently, the EPS 320 maps the packets to scheduling queues and outputs the encapsulated packets in the proper order to the ECP 322. The ECP 322 removes the PFH, RIU header, supertrunk header, and IP encapsulating header and performs L2 and PHY encapsulation functions as required.

The scheduling function, according to the preferred embodiment, utilizes a point-and-serve mechanism along with a Round-Robin (RR) pointer. When a new packet segment arrives at the EPQ 314, the point-and-serve mechanism, in simplistic terms, triggers a packet from the same data stream to be scheduled for servicing. During idle periods, the RR pointer rotates among the data streams in order to schedule packets for servicing from all the different data streams.

Figure 5:
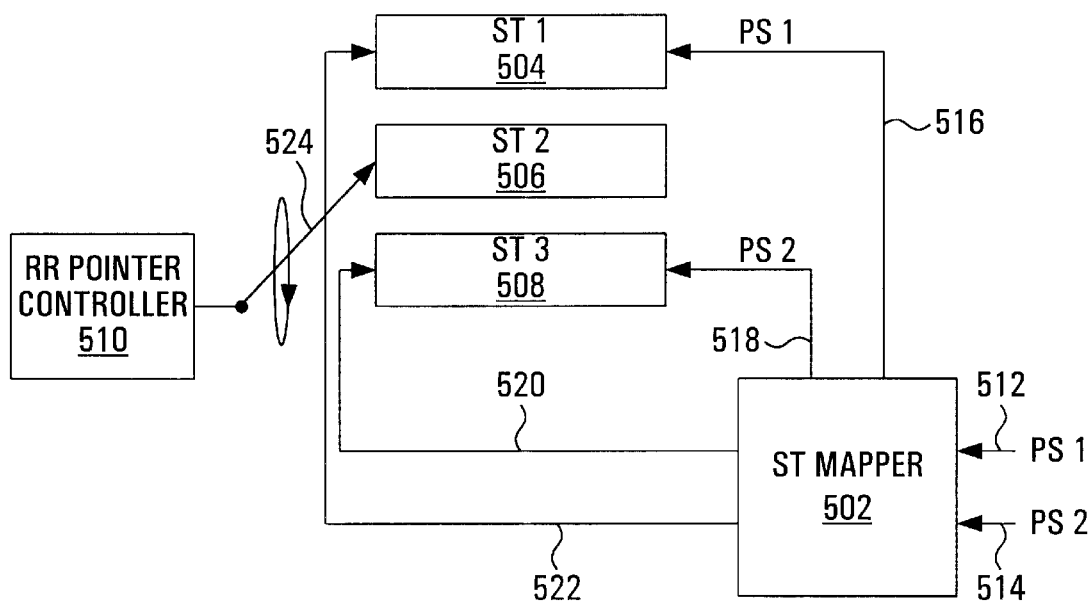
FIG. 5 is a simplified block diagram illustrating the functionality of the Egress Packet Queuer (EPQ) used in the IPF node of FIG. 3.

FIG. 5 depicts a simplified block diagram that illustrates the functionality of the EPQ 314 in a particular embodiment. As shown, the EPQ 314 comprises a Supertrunk (ST) mapper 502, first, second, and third ST memory buffers 504,506,508, and a RR pointer controller 510. Each of these components will be described in detail herein below. Although in this embodiment, the EPQ 314 comprises three ST buffers, it should be understood that this number can vary as the number of different data streams arriving at the EPQ 314 changes.

The ST buffers 504,506,508 are memory areas that have been allocated for a particular data stream. The packets within each ST buffer have been sorted with use of the sorting function so that the packets are in the proper sequence. Each ST buffer has a front packet that is the packet, after being sorted, that is found to be the closest in sequence number to the first packet of the particular data stream. The front packet may be the first packet of the data stream, but does not necessarily have to be since some packets may already have been forwarded for servicing.

In the embodiment depicted within FIG. 5, the ST mapper 502 is input each operational cycle with a first packet segment PS1 via line 512 and a second packet segment PS2 via line 514, an operational cycle being defined by the broadband channel frame time and including one or more system clock cycles. These input packet segments PS1,PS2 are then forwarded via respective lines 516,518 to their respective ST buffers which, in this example, are the first and third ST buffers 504,508 respectively. Although not depicted on FIG. 5, the input packet segments PS1,PS2 are placed within their respective ST buffers 504,508 with use of the sorting function, which utilize the STFI and STSI signals in the preferred embodiment, so that the packets of each data stream are in the proper sequence. The inputting of the packet segments PS1,PS2 into the ST mapper 502 also triggers the direction of first and second ST pointers 520,522 which in this case are directed to the first and third ST buffers 504,508. In general, the ST pointers are directed, in the preferred embodiment, to the ST buffers corresponding to the input packet segments.

The RR pointer controller 510 controls the RR pointer 524, such that each operational cycle the RR pointer 524 is directed to a different ST buffer. Under certain circumstances, as are described herein below in detail, the front packet of the ST buffer being directed to by the RR pointer 524, hereinafter called the RR ST buffer, is scheduled for servicing.

Each ST buffer has a corresponding ST counter ST_CNT that increments by one each time a ST buffer is directed to by the RR pointer 524 without having its front packet scheduled for servicing, assuming that the front packet is ready for scheduling as will be explained herein below. Each time the front packet of a particular ST buffer is scheduled for servicing, its respective ST_CNT is reset. If the ST_CNT exceeds a predetermined value, a starvation flag is triggered for the particular ST buffer and the ST buffer is referred to as a starving ST buffer. The use of the starvation flag will be described herein below as the actual algorithm used is described in detail with reference to FIG. 6.

The steps of the scheduling function, according to one embodiment of the present invention, are now described in detail with reference to FIG. 6. The embodiment depicted in FIG. 6 and described below is for the case that a single packet segment is input to the EPQ 314 and a single packet is capable of being scheduled for service per operational cycle. The preferred embodiment of the present invention is an expanded version of this described embodiment in which for each operational cycle, two packet segments are input to the EPQ 314 and two packets are capable of being scheduled for service, as was depicted in FIG. 5. The differences between these embodiments will be described after the description of FIG. 6.

Figure 6:
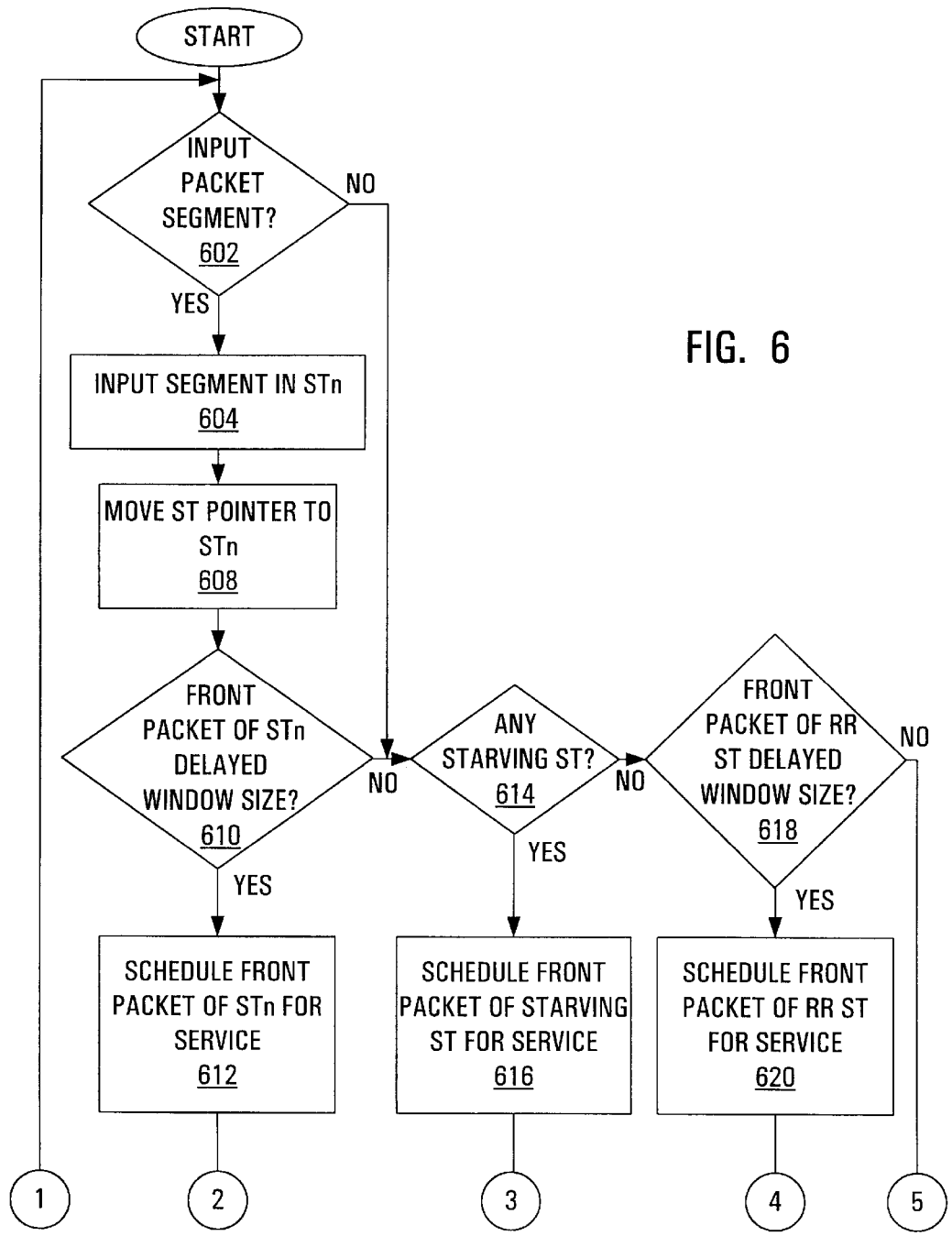
FIG. 6 is a flow chart illustrating the steps performed by the scheduling procedure of one embodiment of the present invention.
Figure 6:
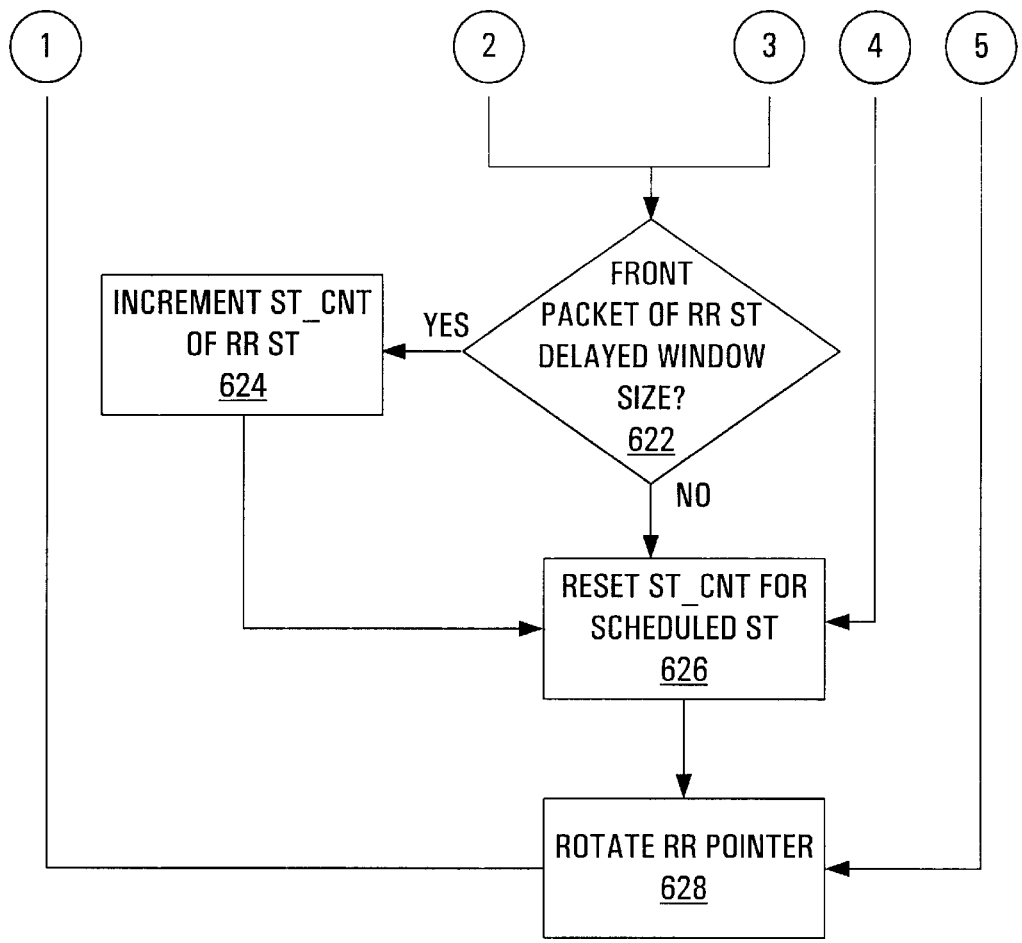

The first step of the scheduling function depicted in FIG. 6 is to determine if a packet segment is input to the EPQ 314 at step 602. No packet segment being input to the EPQ 314 indicates that there is an idle cycle. On the other hand, if a packet segment is input to the EPQ 314, it is input with use of its STFI, at step 604, to a ST buffer that corresponds to the data stream the packet segment belongs, ST n in the case depicted in FIG. 6. The inputting of the packet segment, with use of the sorting function, places the packet segment in the proper order within the corresponding ST buffer. Subsequently, a ST pointer is directed, at step 608, to the ST buffer in which the most recent packet segment has arrived, ST n in the case shown.

After step 608, it is determined at step 610 whether the front packet of the ST buffer in which the ST pointer is currently directed, hereinafter referred to as the selected ST buffer, has been delayed a predetermined window size. The predetermined window size represents the time that a packet must wait prior to being allowed to be scheduled for servicing. This window size represents the average time that a packet is delayed by the physical link traversed. Therefore, after the predetermined window size has expired for the front packet, it is concluded that no packets that were originally sent prior to the front packet are still to arrive.

If, at step 610, it is determined that the front packet of the selected ST buffer has been delayed the predetermined window size, the front packet is scheduled for servicing at step 612. This scheduling for service is done by sending a notification to the EPS 312 that indicates that the particular packet in question is available to be queued into a scheduling queue for later forwarding to the ECP 304 for processing.

If it is determined that no packet segment is input to the EPQ 314 at step 602 or it is determined that the front packet of the selected ST buffer has not been delayed the predetermined window size at step 610, it is determined whether there are any starving ST buffers at step 614. In the case, that there is at least one starving ST buffer detected at step 614, the front packet of the starving ST buffer is scheduled for servicing at step 616 in a similar method to that described at step 612. In the case, that multiple starving ST buffers are detected, the ST buffer with the largest ST_CNT is chosen for scheduling.

If there are no starving ST buffers at step 614, the scheduling function determines, at step 618, whether the front packet of the RR ST buffer has been delayed for the predetermined window size. If it has, the front packet of the RR ST buffer is scheduled for servicing in a similar method as described previously.

If, at step 612 or 616, the front packet of the selected ST buffer or starving ST buffer respectively is scheduled for servicing, the front packet of the RR ST packet is checked, at step 622, to see if it has been delayed the predetermined window size. Hence, it is seen if the RR ST buffer was ready to be scheduled for servicing. If it was determined that the front packet of the RR ST buffer was delayed properly, the ST_CNT corresponding to the RR ST buffer is incremented at step 624.

If the ST_CNT of the RR ST buffer is incremented at step 624, the front packet of the RR ST buffer was not delayed properly at step 622, or the front packet of the RR ST buffer was scheduled for service at step 620, the ST_CNT corresponding to the particular ST buffer that was scheduled for service is reset at step 626.

Subsequent to step 626 or if the front packet of the RR ST buffer was not delayed the predetermined window size at step 618, the RR pointer is rotated to the next ST buffer at step 628. The procedure then is complete for that particular operational cycle with the procedure beginning again at step 602 in the next operational cycle.

There are a number of key considerations that must be addressed when expanding the scheduling algorithm depicted in FIG. 5 to the scheduling algorithm of the preferred embodiment of the present invention. The key difference is that within the preferred embodiment, two packet segments are possibly input to the EPQ 314 and two packets are possibly scheduled for servicing for each operational cycle. This requires two ST pointers to be used, each directed towards one of the ST buffers corresponding to the input packet segments.

There are a number of possible occurrences in which the operation of the scheduling function must be defined for in the preferred embodiment. For one, if both the input packet segments are from the same data stream and therefore will be input to the same ST buffer, the ST pointers are both directed to the same ST buffer. This results, in the preferred embodiment, in the front packet and the second to the front packet being scheduled for servicing if they have both been delayed the predetermined window size.

In the case that one ST pointer is directed at a ST buffer with the front packet delayed sufficiently while the other is not, the algorithm of the preferred embodiment, schedules the front packet that has been properly delayed for servicing and continues in the algorithm depicted in FIG. 6 to determine the second packet, if any, to be scheduled for servicing. If both front packets corresponding to the selected ST buffers are not delayed sufficiently, then the algorithm determines, in this order, if it can schedule the front packet from two starving ST buffers, a starving ST buffer and the current RR ST buffer, a starving ST buffer, or the current RR ST buffer.

Despite expanding the number of input packets and scheduled packets in the preferred embodiment of the present invention, the preference in scheduling remains the same, that being selected ST buffers, starving ST buffers, and then the current RR ST buffer.

Alternative embodiments of the present invention can be contemplated that would increase the numbers of RR pointers, input packets, ST buffers, ST pointers, and/or scheduled packets for servicing. One skilled in the art would be able to make such modifications in the implementation as would be required to implement these embodiments.

Another alternative embodiment has the operational cycle being defined for the inputting of complete packets. Hence, if the packet segment that is input in FIG. 6 is not an End-of-Packet (EOP) segment, the remainder of the scheduling algorithm is delayed until the EOP segment for the particular packet has arrived. Hence, in this embodiment, one packet is possibly input to the EPQ 318 and one packet is possibly scheduled for servicing in each operational cycle.

Persons skilled in the art will appreciate that there are alternative implementations and modifications possible to use an apparatus similar to that described above to provide a scheduling function for data packets and that the above implementation is only an illustration of this embodiment of the invention. The scope of the invention, therefore, is only to be limited by the claims appended hereto.

What is claimed is:

1. A scheduling apparatus capable of being coupled to a plurality of memory buffers, each buffer capable of inputting data packet units and outputting data packets corresponding to a respective single data stream, the scheduling apparatus comprising scheduling logic operable to:

upon input of a first data packet unit to a first memory buffer of said plurality of memory buffers, determine whether a first outputting parameter corresponding to a front packet within the first memory buffer is met; and if the first outputting parameter is met, output the front packet from the first memory buffer;

wherein the scheduling logic further operates to select a round-robin (RR) memory buffer during each inputting of a data packet unit, each memory buffer cyclically being selected as the RR memory buffer; and wherein the scheduling logic further operates, if the first outputting parameter is not met, to determine whether an RR outputting parameter corresponding to a front packet within the RR memory buffer is met and to output the front packet from the RR memory buffer if the RR outputting parameter is met.

2. A scheduling apparatus according to claim 1, wherein the data packet unit is a data packet segment.

3. A scheduling apparatus according to claim 1, wherein the data packet unit is a complete data packet.

4. A scheduling apparatus according to claim 1, wherein the first outputting parameter is met if the front packet within the first memory buffer has been delayed a predetermined time period.

5. A scheduling apparatus according to claim 1, wherein the first outputting parameter is met if the front packet within the first memory buffer has been delayed a first predetermined time period; and wherein the RR outputting parameter is met if the front packet within the RR memory buffer has been delayed a second predetermined time period.

6. A scheduling apparatus according to claim 1, wherein the scheduling logic further operates, when a second data packet unit from a second data stream is input to a second memory buffer concurrently with the inputting of the first data packet unit, to determine whether a second outputting parameter corresponding to a front packet within the second memory buffer is met and to output the front packet from the second memory buffer if the second outputting parameter is met.

7. A scheduling apparatus according to claim 6, wherein the scheduling logic further operates to maintain a counter corresponding to each memory buffer, to select a round-robin (RR) memory buffer during each inputting of data packet units, each memory buffer cyclically being selected as the RR memory buffer, and incrementing the counter of the RR memory buffer if an incrementing parameter is met;

wherein the scheduling logic further operates, if the first outputting parameter is met, to reset the counter of the first memory buffer and, if the second outputting parameter is met, to reset the counter of the second memory buffer; and wherein the scheduling logic further operates, if at least one of the first and second outputting parameters is not met, to determine whether any memory buffers are starving by checking if any counters exceed a predetermined maximum value; if a starving memory buffer is found, to determine whether a starvation outputting parameter, corresponding to a front packet within the starving memory buffer is met and, if the starvation output parameter is met, to output the front packet from the starving memory buffer and to reset the counter of the starving memory buffer; and if no starving memory buffers are found, if the starvation output parameter is not met or if both the first and second outputting parameters are not met, to determine whether a RR outputting parameter corresponding to a front packet within the RR memory buffer is met and, if the RR outputting parameter is met, to output the front packet within the RR memory buffer and reset the counter of the RR memory buffer.

8. A scheduling apparatus according to claim 7, wherein the incrementing parameter is met if the front packet of the RR memory is not output from the RR memory buffer and the RR outputting parameter is met.

9. A scheduling apparatus according to claim 8, wherein if the first and second data streams and the corresponding first and second memory buffers are the same, the front packet within the second memory buffer corresponds to a second front packet within the particular memory buffer;

wherein a second front packet within a particular memory buffer is the packet that is, compared to the other packets within the particular memory buffer, second in sequence within the corresponding data stream.

10. A scheduling apparatus capable of being coupled to a plurality of memory buffers, each buffer capable of inputting data packet units and outputting data packets corresponding to a respective single data stream, the scheduling apparatus comprising scheduling logic operable to:

upon input of a first data packet unit to a first memory buffer of said plurality of memory buffers, determine whether a first outputting parameter corresponding to a front packet within the first memory buffer is met; and if the first outputting parameter is met, output the front packet from the first memory buffer;

wherein the scheduling logic further operates to maintain a counter corresponding to each memory buffer, to select a round-robin (RR) memory buffer during each inputting of a data packet unit, each memory buffer cyclically being selected as the RR memory buffer, and incrementing the counter of the RR memory buffer if an incrementing parameter is met;

wherein the scheduling logic further operates, if the first outputting parameter is met, to reset the counter of the first memory buffer; and wherein the scheduling logic further operates, if the first outputting parameter is not met, to determine whether any memory buffers are starving by checking if any counters exceed a predetermined maximum value; if a starving memory buffer is found, to determine whether a starvation outputting parameter corresponding to a front packet within the starving memory buffer is met and, if the starvation output parameter is met, to output the front packet from the starving memory buffer and to reset the counter of the starving memory buffer; and if no starving memory buffers are found or if the starvation output parameter is not met, to determine whether a RR outputting parameter corresponding to a front packet within the RR memory buffer is met and, if the RR outputting parameter is met, to output the front packet within the RR memory buffer and reset the counter of the RR memory buffer.

11. A scheduling apparatus according to claim 10, wherein the incrementing parameter is met if the front packet of the RR memory is not output from the RR memory buffer and the RR outputting parameter is met.

12. A scheduling apparatus according to claim 10, wherein the first outputting parameter is met if the front packet within the first memory buffer has been delayed a first predetermined time period;

wherein the RR outputting parameter is met if the front packet within the RR memory buffer has been delayed a second predetermined time period; and wherein the starvation outputting parameter is met if the front packet within the starving memory buffer has been delayed a third predetermined time period.

13. A scheduling apparatus capable of being coupled to a plurality of memory buffers, each buffer capable of inputting data packet units and outputting data packets corresponding to a respective single data stream, the scheduling apparatus comprising scheduling logic operable to:

upon input of a first data packet unit to a first memory buffer of said plurality of memory buffers, determine whether a first outputting parameter corresponding to a front packet within the first memory buffer is met; and if the first outputting parameter is met, output the front packet from the first memory buffer;

wherein the scheduling logic further operates, when a second data packet unit from a second data stream is input to a second memory buffer concurrently with the inputting of the first data packet unit, to determine whether a second outputting parameter corresponding to a front packet within the second memory buffer is met and to output the front packet from the second memory buffer if the second outputting parameter is met;

wherein the scheduling logic further operates to select a round-robin (RR) memory buffer during each inputting of data packet units, each memory buffer cyclically being selected as the RR memory buffer; and wherein the scheduling logic further operates, if at least one of the first and second outputting parameters is not met, to determine whether a RR outputting parameter corresponding to a front packet within the RR memory buffer is met and to output the front packet from the RR memory buffer if the RR outputting parameter is met.

14. A forwarding node capable of operation within a router that transfers digital data with a plurality of other routers within a packet routing system, the forwarding node comprising:

a first device that comprises an inputting apparatus that is capable of inputting a plurality of data packet units from a plurality of data streams; a plurality of memory buffers coupled to the inputting apparatus, each memory buffer capable of inputting data packet units and outputting data packets corresponding to a single data stream;

a servicing device that is input with the packets from the memory buffers and performs servicing operations on the individual packets;

a scheduling apparatus capable of being coupled to the plurality of memory buffers, the scheduling apparatus comprising scheduling logic operable to:

upon input of a first data packet unit to a first memory buffer of said plurality of memory buffers, determine whether a first outputting parameter corresponding to a front packet within the first memory buffer is met;

if the first outputting parameter is met, output the front packet from the first memory buffer;

select a round-robin (RR) memory buffer during each inputting of a data packet unit, each memory buffer cyclically being selected as the RR memory buffer; and if the first outputting parameter is not met, determine whether an RR outputting parameter corresponding to a front packet within the RR memory buffer is met and to output the front packet from the RR memory buffer if the RR outputting parameter is met.

15. A forwarding node according to claim 14, wherein the first device further comprises a packet sorting device that re-orders the data packet units input to the memory buffers into the proper order with use of a sorting algorithm.

16. A forwarding node according to claim 15 comprising an ingress block that is arranged to input packets from a transmission device, an egress block that is arranged to output packets to the transmission device and comprises the first device and the servicing device, and a switch interface, coupled to both the ingress and egress blocks, that is arranged to be coupled to a switch apparatus.

17. A forwarding node according to claim 16, wherein the ingress block comprises an ingress processor coupled in series with an ingress filter and mapper and an ingress port controller that is further coupled to the switch interface, and the egress block comprises an egress queuer coupled to the switch interface and further coupled in series with an egress scheduler and an egress processor;

wherein the egress queuer comprises the first device and the egress processor comprises the servicing device.

18. A packet routing system that transfers digital data between a plurality of the routers, the packet routing system comprising:

a first forwarding node comprising a first device that comprises an inputting apparatus that is capable of inputting a plurality of data packet units from a plurality of data streams; a plurality of memory buffers coupled to the inputting apparatus, each memory buffer capable of inputting data packet units and outputting data packets corresponding to a single data stream;

a servicing device that is input with the packets from the memory buffers and performs servicing operations on the individual packets;

a scheduling apparatus capable of being coupled to the plurality of memory buffers, the scheduling apparatus comprising scheduling logic operable to:

upon input of a first data packet unit to a first memory buffer of said plurality of memory buffers, determine whether a first outputting parameter corresponding to a front packet within the first memory buffer is met;

if the first outputting parameter is met, output the front packet from the first memory buffer;

select a round-robin (RR) memory buffer during each inputting of a data packet unit, each memory buffer cyclically being selected as the RR memory buffer; and if the first outputting parameter is not met, determine whether an RR outputting parameter corresponding to a front packet within the RR memory buffer is met and to output the front packet from the RR memory buffer if the RR outputting parameter is met;

a route controller and a rotator space switch;

at least one second forwarding node, coupled to both the route controller and the rotator space switch, comprising a load balancing device that, when input with individual packets of a data stream, reads a logical output port corresponding to the data stream, assigns each of the individual packets of the data stream to a physical output port within the logical output port based upon physical link criteria, encapsulates the individual packets with a first routing header that comprises a data stream identifier, a packet sequence identifier, and a physical output port identifier, and outputs the packets to their assigned physical output ports;

at least one third forwarding node, coupled to both the route controller and the rotator space switch, that is arranged to operate as a physical output port for outputting encapsulated packets to at least one transmission apparatus;

at least one fourth forwarding node, coupled to both the route controller and the rotator space switch, that is arranged to operate as a physical input port for receiving encapsulated packets from at least one transmission apparatus; and the first forwarding node, coupled to the route controller and the rotator space switch, further comprising a packet sorting device that, when input with encapsulated packets, re-orders the packets into the proper order within the memory buffers with use of a sorting algorithm utilizing the packet sequence identifiers; and wherein the servicing device, after performing servicing on the packets, outputs a data stream corresponding to the re-ordered packets.

19. A method of scheduling the output of packets comprising:

operating with a plurality of memory buffers, each memory buffer capable of inputting data packet units and outputting data packets corresponding to a single data stream;

if a first data packet unit from a first data stream is input to a first memory buffer, determining whether a first outputting parameter corresponding to a front packet within the first memory buffer is met;

outputting the front packet from the first memory buffer if the first outputting parameter is met;

selecting a round-robin (RR) memory buffer during each inputting of a data packet unit, each memory buffer cyclically being selected as the RR memory buffer; and determining, if the first outputting parameter is not met, whether an RR outputting parameter corresponding to a front packet within the RR memory buffer is met and to outputting the front packet from the RR memory buffer if the RR outputting parameter is met.

* * * * *